(12) United States Patent
Vacondio et al.

(10) Patent No.: US 9,071,382 B2
(45) Date of Patent: Jun. 30, 2015

(54) METHOD OF OPTICAL DATA TRANSMISSION USING POLARIZATION DIVISION MULTIPLEXING

(75) Inventors: Francesco Vacondio, Paris (FR); Olivier Rival, Bourg la Reine (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/994,011

(22) PCT Filed: Jan. 9, 2012

(86) PCT No.: PCT/EP2012/050268
§ 371 (c)(1),
(2), (4) Date: Jun. 13, 2013

(87) PCT Pub. No.: WO2012/104116
PCT Pub. Date: Aug. 9, 2012

(65) Prior Publication Data
US 2013/0308947 A1    Nov. 21, 2013

(30) Foreign Application Priority Data

Jan. 31, 2011   (EP) ..................... 11290067

(51) Int. Cl.
*H04J 14/06* (2006.01)
*H04B 10/2543* (2013.01)

(52) U.S. Cl.
CPC ............ *H04J 14/06* (2013.01); *H04B 10/2543* (2013.01)

(58) Field of Classification Search
CPC ........... H04B 10/5055; H04B 10/5561; H04B 10/588
USPC .......................................... 398/65, 184, 185
See application file for complete search history.

(56) References Cited

U.S. PATENT DOCUMENTS

2003/0090768 A1    5/2003    Liu et al.
2006/0159466 A1    7/2006    Kim et al.
(Continued)

FOREIGN PATENT DOCUMENTS

CN    1808946    7/2006
CN    101843019    9/2010
(Continued)

OTHER PUBLICATIONS

Bertran-Pardo, O. et al; Demonstration of the Benefits Brought by PMD in Polarization-Multiplexed Systems; Optical Communication (ECOC), 2010 36th European Conference and Exhibition on, IEEE, Piscataway, NJ, USA; Sep. 19, 2010; pp. 1-3; XP031789543; ISBN: 978-1-4244-8536-9.

(Continued)

*Primary Examiner* — David Payne
*Assistant Examiner* — Casey Kretzer
(74) *Attorney, Agent, or Firm* — Patti and Malvone Law Group, LLC

(57) ABSTRACT

Proposed is a method of optical data transmission. A first data signal and a second data signal are received at a same sampling rate. A third data signal and a fourth data signal are generated, using the first and the second data signal, wherein the two data signals are delayed to each other by a delay time that is varied over time. The phase of a first optical signal is modulated in dependence on the third data signal, and the phase of a second optical signal with a same wavelength is modulated in dependence on the fourth data signal. The first optical signal is transmitted in a first polarization plane into an optical fiber, and the second optical signal is transmitted in a second polarization plane orthogonal to the first polarization plane into the optical fiber.

9 Claims, 3 Drawing Sheets

(56) References Cited

U.S. PATENT DOCUMENTS

| | | | |
|---|---|---|---|
| 2010/0054738 A1 | 3/2010 | Yuki | |
| 2010/0209121 A1 | 8/2010 | Tanimura | |
| 2010/0272446 A1* | 10/2010 | Harley et al. | 398/184 |
| 2011/0044702 A1* | 2/2011 | Mizuguchi et al. | 398/184 |
| 2011/0131439 A1* | 6/2011 | Renner et al. | 713/401 |
| 2011/0176816 A1* | 7/2011 | Ooi et al. | 398/184 |
| 2011/0229148 A1* | 9/2011 | Nishihara et al. | 398/183 |

FOREIGN PATENT DOCUMENTS

| | | |
|---|---|---|
| CN | 101895495 | 11/2010 |
| EP | 1404038 | 3/2004 |
| EP | 2221999 | 2/2010 |
| JP | 2010057106 | 3/2010 |
| JP | 2010193204 | 9/2010 |
| JP | 2010539818 | 12/2010 |
| WO | 2009036390 | 3/2009 |

OTHER PUBLICATIONS

Yamanaka, S. et al; 11×171 Gb/s PDM 16-QAM Transmission over 1440 km with a Spectral Efficiency of 6.4 b/s/Hz Using High-Speed DAC; Optical Communicaiton (ECOC), 2010 36th European Conference and Exhibition ON, IEEE, Piscataway, NJ, USA; Sep. 19, 2010, pp. 1-3; XP031789770; ISBN: 978-1-4244-8536-9.

Bononi, A. et al; Nonlinear Signal-Noise Interactions in Dispersion-Managed Links with Various Modulation Formats; Optical Fiber Technology; Academic Press; London; US; vol. 16, No. 2; Mar. 1, 2010; pp. 73-85; XP026948251; ISSN: 1068-5200; DOI: DOI:10.1015/J.YOFTE.2009.11.001; [Retrieved on Mar. 1, 2010].

Alfiad, M. et al; Long-Haul Transmission of Polarization Multiplexed Signals with Coherent Detection; Transparent Optical Networks (ICTON), 2010 12th International Conference on, IEEE, Piscataway, NJ, USA; Jun. 27, 2010; pp. 1-4; XP031733361; ISBN: 978-1-4244-7799-9.

Fuerst, C.; Quaternary Phase Shift Keying for High Speed DWDM Transmission; Optical Internet, 2008, COIN 2008; 7th International Conference on, IEEE, Piscataway, NJ, USA; Oct. 14, 2008; pp. 1-2; XP031417941; ISBN: 978-4-88552-230-7.

Magnus Karlsson et al; Effects of Nonlinearities on PMD-Induced System Impairments; Journal of Lightwave Technology, IEEE Service Center, New York, NJ, US; vol. 24, No. 11; Nov. 1, 2006; pp. 4127-4137; XP011150124; ISSN: 0733-8724; DOI: DOI:10.1109/JLT.2006.884200.

* cited by examiner

METHOD OF OPTICAL DATA TRANSMISSION USING POLARIZATION DIVISION MULTIPLEXING

FIELD OF THE INVENTION

The invention relates to a method of optical data transmission using polarization division multiplexing.

BACKGROUND

In optical data transmission, data may be transmitted by modulating the phase or the phase and the amplitude of an optical wavelength in dependence on the transmission data and in accordance with a constellation diagram of a respective modulation method. Each point of the constellation diagram represents a finite set of data bits that are to be transmitted. Depending on the set of data bits that are to be transmitted, the phase or the phase and the amplitude of the optical wavelength is changed such that the resulting signal corresponds to the respective point of the constellation diagram. Such a modulation method is a digital modulation method. An example for a phase modulation method is the phase-shift keying (PSK) method called quadrature phase-shift keying (QPSK), in which each point of the corresponding constellation diagram represents two bits. An example of a method for modulating the phase and the amplitude of the optical signal is the method called 16-Quadrature-Amplitude-Modulation (QAM), in which each point of the corresponding constellation diagram represents four bits.

The set of bits represented by a point of a constellation diagram is called a symbol. The rate, by which the phase of the wavelength is changed and by which therefore the symbol changes, is called the symbol rate.

In order to increase the data rate for transmitting data via such a modulation of a specific optical wavelength, a technique called Polarization Division Multiplexing (PDM) may be exploited:
  a first optical signal of the specific wavelength and of a first polarization state is modulated in dependence on a first data stream,
  a second optical signal of the same specific wavelength and of a second polarization state, which is orthogonal to the first polarization state, is modulated in dependence a second data stream, and
  both optical signals are transmitted over a same optical fibre as a combined optical signal with a respective state of polarization that is the result of the first and the second polarization state.

At a receiving side, the two optical signals generated by PDM may be obtained, by sampling the optical field resulting from the combined signal along two states of polarization that are orthogonal to each other.

For further increasing the data rate, the technique of PDM may be applied to optical signals of different optical wavelengths, and then these optical signals of different optical wavelengths are transmitted over a same optical fibre. This is called Wavelength Division Multiplexing (WDM).

When transmitted in an ideal optical fibre, the state of polarization of the combined optical signal generated by PDM would experience a rotation with respect to its value at the transmitter, such that the polarization state of the combined signal is rotated. At a receiving side, the two transmitted optical signals along with their respective states of polarizations forming the combined signal can be recovered after sampling the optical field of the received combined optical signal along two arbitrary orthogonal polarization states.

One effect occurring when transmitting an optical signal at a specific wavelength in a specific polarization state over a non-ideal fibre is the effect known as cross-polarization modulation. Cross-polarization modulation describes a generation of another optical signal at the same wavelength but with another polarization state that is orthogonal to the specific polarization state of the transmitted optical signal. Thus, due to cross-polarization modulation, the first optical signal may generate signal components of the polarization state of the second optical signal, which may lead to a degradation of the second optical signal, and vice versa.

The effect known as cross-phase modulation describes an impact of one optical wavelength onto the phase of another optical wavelength, when transmitted over a same optical fibre that is not ideal. Thus, when performing Wavelength Division Multiplexing (WDM) by transmitting multiple optical signals with respective wavelengths over a same non-ideal optical fibre, the different optical signals may degrade each others phases.

Cross-polarization modulation and cross-phase modulation are transmission distortions caused by nonlinearities of an optical fibre, such as for example the Kerr effect. The Kerr effect it arises from a change of the fibres refractive index, which in turn is caused by the signal power of the transmitted signal within the fibre. In the case of using the techniques of PDM, multiple signals are transmitted, wherein each signal power of a transmitted signal has an own random character. Therefore, the overall Kerr effect caused by the different signal powers also has a random character, and thus in turn the overall transmission distortions of cross-polarization and cross-phase modulation vary in time and have a random character. Furthermore, additional effects such as thermal stress or mechanical stress acting on the optical fibre may cause stress-induced birefringences of the optical fibre, which in turn further add to the overall random character of the transmission distortions.

When receiving a combined optical signal with a polarization state that is the result of two orthogonally polarized optical signals, it is a common procedure to generate two received time-discrete signals, by sampling the received combined optical signal in two polarization planes that are orthogonal to each other, wherein these polarization planes of sampling are not necessarily identical to the polarization states at which the two orthogonally polarized optical signals are received. The polarization planes of sampling may be rotated in relation to the polarization states of the two optical signals forming the combined optical signal. This rotation is compensated for, by filtering the two received time-discrete signals using a set of finite-impulse response (FIR) filters and thus generating two filtered time-discrete signals. The filter coefficients of the FIR filters are determined using a constant modulus algorithm (CMA). The two filtered time-discrete signals are then used for demodulating respective received time-discrete data signals from them.

The effects of cross-polarization and cross-phase modulation may lead to a degradation of the transmitted optical signals and thus to bit errors when demodulating data signals from the filtered time-discrete signals on the receiving side. Occurring bit errors might be compensated, by encoding data bits into a block of bits using a forward error correction (FEC) encoding algorithm on the transmitting side before modulating the optical signal, and then decoding on the receiving side the received block of bits according to the used FEC algorithm. A FEC algorithm is able to correct only a maximum number of bit errors per block.

It has been observed by the inventors, that when transmitting data using the above mentioned techniques in conjunction, the number of bit errors—or the bit error ratio (BER)—caused by cross-polarization and cross-phase modulation are not constant over time. A peak of bit errors—or a peak of the BER—is called a burst of bit errors. Such a burst in turn leads to FEC blocks, for which the number of correctable bits may be exceeded. Therefore, transmitted data bits of a data signal may remain uncorrected on the receiving side after FEC decoding.

It is therefore an aim of the invention to improve the known method of data transmission.

The document D1 discloses a system, in which polarization mode dispersion is introduced after previously modulating an optical signal using an optical sequence.

The document D2 discloses a system, in which in-phase and quadrature signal components of a single modulated optical signal with one single polarization state are delayed to each other, in order to achieve a decorrelation of these signal components for this single optical signal. The single optical signal with the single polarization state is then provided to a device that emulates polarization multiplexing.

This polarization multiplexing device takes the single optical signal with the single polarization state and creates two delayed versions of the single optical on two orthogonal polarizations planes, in order to emulate polarization multiplexing.

The document D3 discloses a system, in which dispersion compensation is carried out at a receiving device using a finite impulse response filter (FIR).

SUMMARY

A method of optical data transmission is proposed. The method comprises different steps.

A first time-discrete data signal and a second time-discrete data signal are received at a same sampling rate. A third time-discrete data signal and a fourth time-discrete data signal are generated at the sampling rate, using the first data signal and the second data signal, wherein the first data signal and the second data signal are delayed to each other by a delay time. The delay time is varied over time.

The phase of a first optical signal with a wavelength and with a polarization state is modulated in dependence on the third data signal. The phase of a second optical signal with the wavelength and with a polarization state is modulated in dependence on the fourth data signal. Finally, the first and the second optical signal are transmitted into an optical fibre, such that the polarization state of the first optical signal is orthogonal to the polarization state of the second optical signal.

In order to appreciate the achievement of the proposed method, the following considerations have to be taken into account. As it has been outlined above, when transmitting a number of data signals provided by an FEC encoding algorithm using phase modulation and PDM, the effects of cross-polarization and cross-phase modulation have a random character leading to a non-constant BER which might exceed the capability of a FEC algorithm for certain FEC blocks during a burst of bit errors.

By delaying the two data signals to each other before modulating them onto the two optical signals of separate polarization states, it is achieved that the resulting optical signals are also delayed to each other. Such a delay of the optical signals with orthogonal polarization states is a cause known from the effect called Polarization Mode Dispersion (PMD). Thus, by delaying the two data signals to each other and by furthermore varying the delay over time, an emulation of PMD as a transmission distortion with a random character is implemented. This is achieved by measures taken in the domain of time-discrete data signals instead of taking measures in the domain of the optical signals. The random character of the emulated PMD as an emulated transmission distortion changes the overall random character of the overall transmission distortions, since now not only cross-polarization and/or cross-phase modulation with their own random character cause transmission distortions, but also the random character of the emulated PMD contributes to the overall random character of the transmission distortions.

The transmission distortion caused by the emulated PMD is a delay between the two optical signals. This delay can be compensated for on a receiving side using the FIR filters controlled by the CMA. Thus, by changing the overall random character of transmission distortions, the probability of an occurrence for a burst of bit errors is lowered. Thus, there are less FEC blocks for which the number of correctable bit errors is exceeded. In other words: although the delay introduced between the two data signals is an additional transmission distortion, this transmission distortion can be compensated for on the receiving side, and helps at the same time to change the overall random character of all signal distortions occurring during the transmission in order to reduce the probability of bit error bursts.

DESCRIPTION OF EMBODIMENTS

Figure 1:
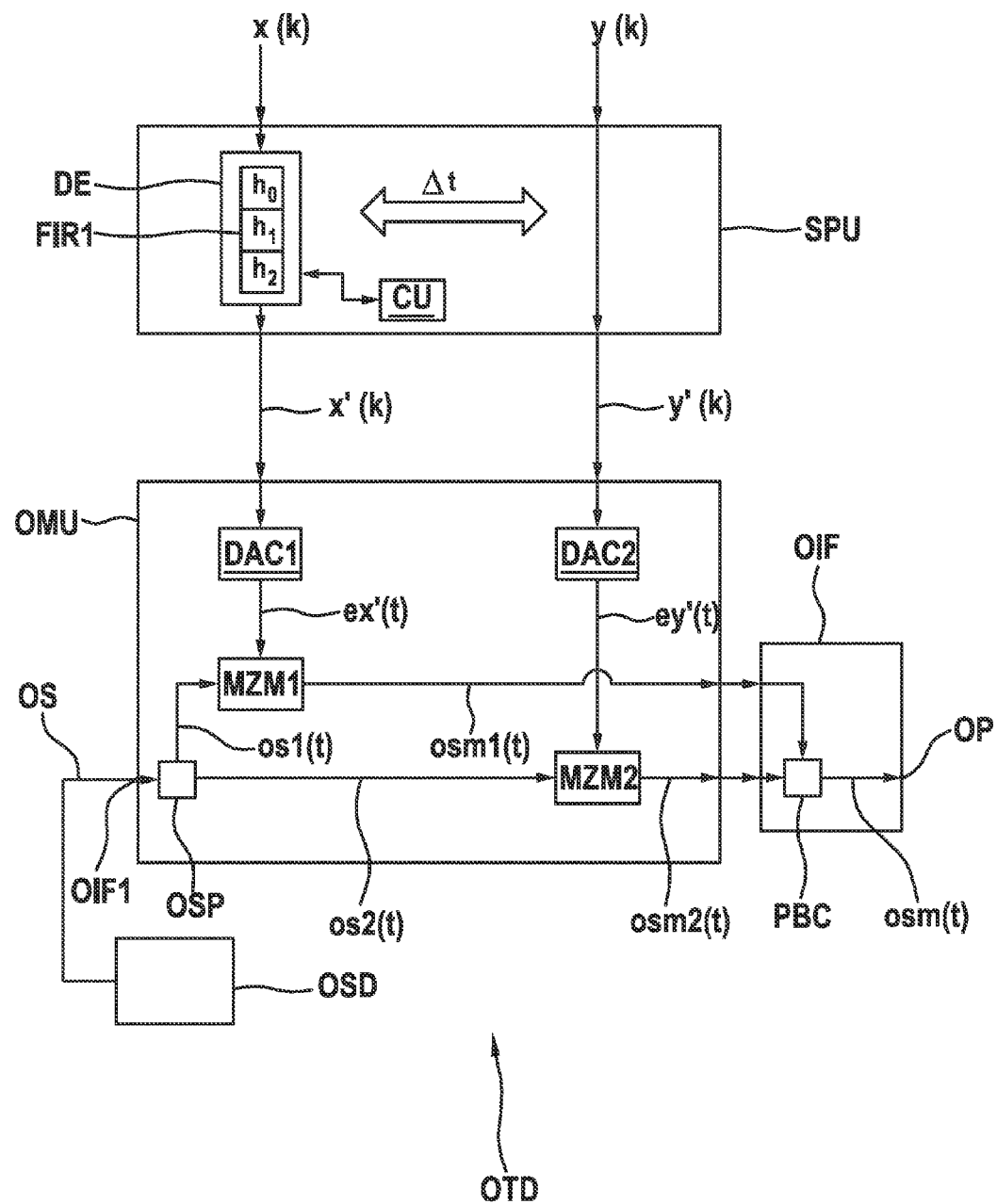
FIG. 1 shows a block diagram of a proposed optical transmission device.

FIG. 1 shows a block diagram of the proposed optical transmission device OTD. The optical transmission device OTD contains a signal processing unit SPU, which is adapted to receive a time-discrete data signal x(k), wherein k is the time-discrete index, and a time-discrete data signal y(k). Both data signals x(k), y(k) are received at a same sampling rate. The data signals x(k), y(k) are preferably provided by a FEC encoding unit not shown in FIG. 1. Thus, the data signals x(k), y(k) are preferably time-discrete FEC encoded data signals.

The signal processing unit SPU generates from the data signals x(k), y(k) further time-discrete data signals data signals x'(k), y'(k). The signal processing unit SPU contains at least one delay element DE for delaying the data signals x(k), y(k) to each other by a delay time $\Delta t$. The delay element DE is preferably a time-discrete finite impulse response filter FIR1, having a number of N filter coefficients. Alternatively, the delay element DE is a memory device that is able to delay a time-discrete data signal by the delay time $\Delta t$.

In the example of FIG. 1, the finite impulse response filter FIR1 has three memory elements, and thus the impulse response h(k) of the filter FIR1 has a length of three filter coefficients. The number of N=3 filter coefficients is only chosen exemplarily and shall not limit the proposed method to this number.

The output signal x'(k) can be described using the input signal x(k) and the impulse response h(k) as $$x'(k)=x(k)*h(k).$$

The maximum time delay $\Delta t_{MAX}$ that can be generated between the input data signals x(k) and y(k) is equal the number N of filter coefficients minus 1 divided by the sampling rate $f_{SR}$ of the signals x(k), y(k), x'(k), y'(k) as $$\Delta t_{MAX} = \frac{N-1}{f_{SR}}.$$

The filter coefficients $h_k$ of the impulse response h(k) satisfy the condition $$\sum_{k=0}^{N-1} |h(k)|^2 = 1,$$

which means that the sum of the filter coefficients is equal to 1. This ensures, that the energy of the input signal x(k) is preserved.

Preferably, the filter coefficients of the impulse response h(k) are chosen such, that one of the filter coefficients is equal to one, while the other filter coefficients are equal to zero. By this choice, the filter FIR1 would cause one single delay between the two input signals x(k) and y(k).

Alternatively, the filter coefficients of the impulse response h(k) may be chosen such, that multiple filter coefficients are greater than zero, while still satisfying the condition $$\sum_{k=0}^{N-1} |h(k)|^2 = 1$$

previously mentioned above. By this, the filter FIR1 would cause a fractional delay between the two input signals x(k) and y(k).

In this example, the input signal y(k) remains unchanged and is equal to the output signal y'(k). Alternatively, both input signals x(k), y(k) may be filtered by separate delay elements, in order to delay them to each other.

The signal processing unit SPU contains a control unit CU, which controls the delay element DE such, that the delay time Δt varies over time. In the case that the delay element is a finite impulse response filter FIR1, the control unit CU controls the filter coefficients of the filter FIR1 such, that a delay time caused by the filter FIR1 is varied over time. Preferably, the delay time Δt is varied at a frequency $f_{\Delta t}$ that is significantly smaller than the sampling rate $f_{SR}$, $$f_{\Delta t} << f_{SR}.$$

The control unit CU may be implemented as a hardware device, which is either an integral part of the signal processing unit SPU or a device separate from the signal processing unit, in which case the control unit CU is connected to the signal processing unit via a control interface.

Alternatively, the control unit is implemented in software running on the signal processing unit.

The time-discrete output data signals x'(k) and y'(k) are provided to an optical modulation unit OMU. The optical modulation unit OMU contains at least one digital analogue converter DAC1, DAC2, for converting the time-discrete output data signal x'(k) to an analogue electrical data signal ex'(t) and for converting the time-discrete output data signal y'(k) to an analogue electrical data signal ey'(t).

The optical modulation unit OMU receives at an optical interface OIF1 an optical signal OS. The optical signal OS is generated and provided by an optical source device OSD, which is preferably a laser. The optical signal OS is generated and provided such, that the optical signal has a single fixed wavelength and such that it has a single polarization state.

The optical modulation unit OMU contains an optical splitting device OSP for splitting the optical signal OS into an optical signal os1(t), that is provided to an optical modulation device MZM1, and into an optical signal os2(t), that is provided to another optical modulation device MZM2. The optical signal OS is split such, that the optical signals os1(t) and os2(t) have the same wavelength and the same polarization state as the optical signal OS. Alternatively, the optical signal OS is split such, that the optical signals os1(t) and os2(t) have the same wavelength and polarization states that are orthogonal to each other.

At the optical modulation device MZM1, the phase of the optical signal os1(t) is modulated in dependence on the analogue electrical data signal ex'(t) and in accordance with a phase-shift keying modulation method. Thus, the optical signal os1(t) is modulated in dependence on the time-discrete data signal x'(k) from which the analogue electrical data signal ex'(t) was generated. The optical modulation device MZM1 is preferably a Mach-Zehnder Modulator. The optical signal os1(t) is modulated, such that its polarization state is preserved. The result of the modulation is the optical signal osm1(t) that is provided at the output of the optical modulation device MZM1.

At the optical modulation device MZM2, the phase of the optical signal os2(t) is modulated in dependence on the analogue electrical data signal ey'(t) and in accordance with a phase-shift keying modulation method. Thus, the optical signal os2(t) is modulated in dependence on the time-discrete data signal y'(k) from which the analogue electrical data signal ey'(t) was generated. The optical modulation device MZM2 is preferably a Mach-Zehnder Modulator.

The optical signal os2(t) is modulated, such that its polarization state is preserved. The result of the modulation is the optical signal osm2(t) that is provided at the output of the optical modulation device MZM1.

The optical modulation unit OMU provides the modulated optical signal osm1(t) and the modulated optical signal osm2(t) to an optical interface OIF. The optical interface OIF contains a polarization beam combiner PBC. The polarization beam combiner PBC combines the optical signal osm1(t) and the optical signal osm2(t) to a combined output signal osm(t), by rotating at least one of the optical signals osm1(t) and osm2(t) in its polarization state, such that the polarization states of the optical signals osm1(t), osm2(t) are orthogonal to each other. Alternatively, the optical signals osm1(t) and osm2(t) have polarization states that are orthogonal to each other before these optical signals osm1(t) and osm2(t) enter the polarization beam combiner PBC, and the polarization beam combiner PBC combines the optical signals osm1(t) and osm2(t) to a combined optical output signal osm(t), such that the orthogonality of the respective polarization states is preserved. Thus, the combined optical output signal osm(t) is an optical signal that contains two optical signals osm1(t), osm2(t) with orthogonal polarization states.

The optical signals osm1(t) and osm2(t) preferably have orthogonal polarization states, which are linear polarization states. Alternatively, the optical signals osm1(t) and osm2(t) have orthogonal polarization states, which are circular polarization states. As an even further alternative, the optical signals osm1(t) and osm2(t) have orthogonal polarization states, which are elliptical polarization states.

The optical output signal osm(t) is then transmitted into an optical fibre at an output OP of the optical interface OIF.

As it has been outlined previously, the advantage of delaying the time-discrete input data signals x(k) and y(k) to each other by a varying delay time Δt is, that the resulting optical signals are also delayed to each other, which is a cause known from PMD. Thus, an emulation of PMD with a random character is implemented, which changes the overall random character of the transmission distortions, since now not only cross-polarization and cross-phase modulation with their own random character cause transmission distortions, but also the random character of the emulated PMD contributes to the overall random character of the transmission distortions. Thus, by changing the overall random character of signals distortions, the probability of an occurrence for a burst of bit errors is lowered. Thus, there are less FEC blocks for which the number of correctable bit errors is exceeded.

The achievement can also be expressed in terms of the Q-factor known from "G. P. Agrawal, Fiber-Optic Communication Systems, New York, Wiley, 1992" as well as "Role of Q-Factor and of Time Jitter in the Performance Evaluation of Optically Amplified Transmission Systems, F. Matera and M. Settembre, IEEE JOURNAL OF SELECTED TOPICS IN QUANTUM ELECTRONICS, VOL. 6, NO. 2, MARCH/APRIL 2000", and which takes into account the bit error ratio (BER) as $$Q = \sqrt{2}\, erfc^{-1}(BER).$$

The logarithmic value $$20 \log 10(Q)$$

of the Q-factor is related almost linearly to the signal to noise ratio (SNR) of the transmitted optical signal in optical transmission systems in the absence of nonlinear distortions. In the presence of nonlinear effects such as the Kerr effect, the higher the power is, the more detrimental the nonlinear distortions are. For a given power and SNR, a lower number of uncorrected block and an improved Q-factor are achieved when using the proposed method in comparison to not delaying the signals x(k) and y(k) to each other. Therefore, the transmission system may operate more reliably with a higher Q-factor margin with respect to the FEC threshold, or be used for propagation over longer distances.

The signal distortion caused by the emulated PMD is a delay between the two optical signals. This delay can be compensated for on a receiving side using the FIR filters controlled by the CMA. An example of such a receiving device is shown in FIG. 2.

Figure 2:
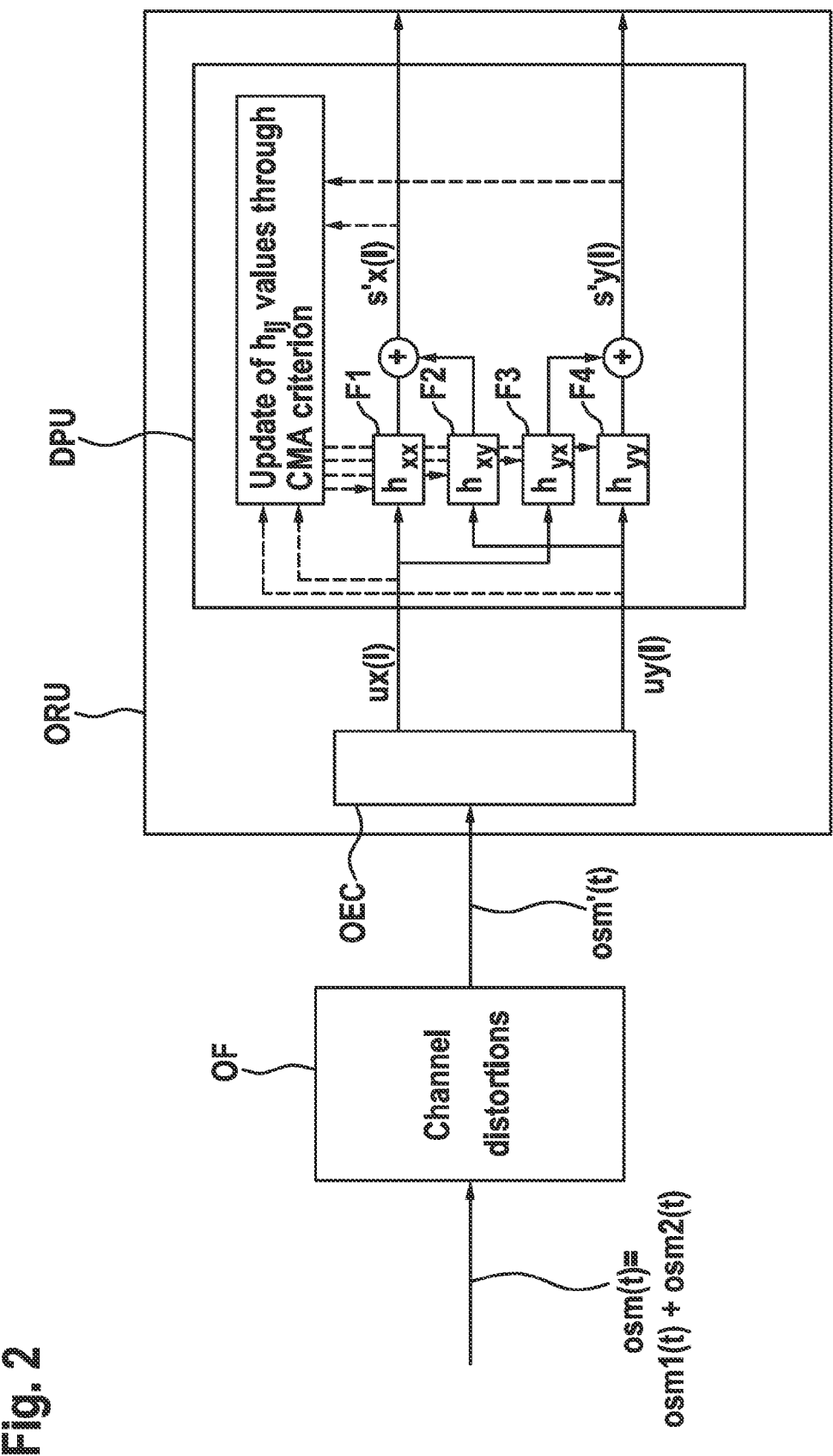
FIG. 2 shows a block diagram of an optical receiving device.

FIG. 2 shows an optical reception unit ORU, which receives an optical signal osm'(t). The optical signal osm'(t) is the signal resulting from the transmission of the optical signal osm(t) over an optical fibre OF.

The optical reception unit ORU contains at least one optical-electrical conversion device OEC. The optical-electrical conversion device OEC samples the received optical signal osm'(t) in two polarization planes that are orthogonal to each other. By sampling the optical signal osm'(t) in one polarization plane, the optical-electrical conversion device OEC generates a time-discrete electrical signal ux(l). By sampling the optical signal osm'(t) in the other polarization plane, the optical-electrical conversion device OEC generates a time-discrete electrical signal uy(l). The optical-electrical conversion device OEC contains preferably at least one analogue-digital converter.

As it has been outlined previously, due to the transmission over the optical fibre OF, the polarization state of the optical field of the combined signal osm(t) resulting from the combining of signal components os1(t) and os2(t) may rotate with respect to its value at the transmitting side. The orthogonal polarization planes, in which the received signal osm'(t) is sampled are not necessarily identical to the polarization planes, at which the signal components os1(t) and os2(t) arrive at the receiving side.

The optical-electrical conversion device OEC provides the time-discrete electrical signals ux(l) and uy(l) to a data processing unit DPU. The data processing unit DPU provides at least four finite-impulse response filters F1, F2, F3, F4, which all have a filter length of M filter coefficients.

The data processing unit DPU provides the electrical signal ux(l) to the filters F1 and F3, and the electrical signal uy(l) to the filters F2 and F4. The output signals of the filters F1 and F2 are combined to an output electrical signal s'x(l). The output signals of the filters F3 and F4 are combined to an output electrical signal s'y(l). The input electrical signals ux(l) and uy(l) and the output electrical signals s'x(l) and s'y(l) are used in the data processing unit DPU for determining the filter coefficients of the filters F1, F2, F3, F4.

The filter coefficients of the filters F1, F2, F3, F4 are determined using a CM Algorithm, as described in "Digital Coherent Optical Receivers: Algorithms and Subsystems, Seb J. Savory, IEEE JOURNAL OF SELECTED TOPICS IN QUANTUM ELECTRONICS, VOL. 16, NO. 5, SEPTEMBER/OCTOBER 20102". The filter coefficients of the filters F1, F2, F3, F4 are determined by this Algorithm, such that a rotation of the polarization state of the combined optical signal osm(t) with its components os1(t) and os2(t) in relation to the polarization planes of sampling is compensated for. Thus, the resulting electrical signals s'x(l) and s'y(l) can be used for demodulating respective data signals from them, in order to obtain estimates of the transmitted data signals x(k) and y(k). This demodulation can be performed by a demodulation unit not shown in FIG. 2. These estimates of the transmitted data signals x(k) and y(k) can then be provided to a unit of FEC decoding, not shown in FIG. 2, for obtaining respective data streams from the estimates of the data signals x(k) and y(k).

It has to be taken into consideration, that the CM Algorithm is able to determine the filter coefficients of the filters F1, F2, F3, F4 also such, that a delay time $\Delta t_{OF}$, caused by PMD of the optical fibre itself, between the signal components os1(t) and os2(t) is compensated for. Furthermore, it has to be taken into consideration by looking at Figure, that a delay time Δt caused between the respective data signals x(k) and y(k) on the transmitting side by the delay element FIR1 can also be compensated for by the CM Algorithm. Thus, the delay time Δt caused by the delay element FIR1 shown in FIG. 1 helps to change the over all random character of signal distortions, as it has been outlined previously above, but can be compensated for at a receiving unit such as the optical reception unit ORU.

The maximum delay time $\Delta t_{MAX-COMP}$, which the CM Algorithm is able to compensate for, is defined by the number M of filter coefficients of the filters F1, F2, F3, F4 and the sampling rate $f_{OSR}$, at which the optical signal osm'(t) is sampled, as $$\Delta t_{MAX-COMP} = \frac{M-1}{f_{OSR}}.$$

Since the optical fibre OF, shown in FIG. 2, itself is subject to PMD causing a mean time delay $\Delta t_{PMD-OF}$, the time delay Δt caused at the transmitting side has to be kept below a predefined threshold $\Delta t_{THRESH}$.

Since the time delays $\Delta t$ and $\Delta t_{PMD-OF}$ caused by the filter FIR1 at the transmitting side and by the optical fibre are each subject to random processes with a respective variant $\sigma_{\Delta t}^2$, $\sigma_{\Delta t\text{-}PMDO\text{-}OF}^2$, the sum of these random processes has a variant $\sigma_\Sigma^2$ that can be expressed as $$\sigma_\Sigma^2 = \sigma_{\Delta t}^2 + \sigma_{\Delta t\text{-}PMD\text{-}OF}^2.$$

Therefore, the overall time delay $\Delta t_{SUM}$ can be expressed as $$\Delta t_{SUM}^2 = \Delta t^2 + \Delta t_{PMD-OF}^2.$$

Thus, the overall threshold $\Delta t_{THRESH}$ can be derived from the mean time delay $\Delta t_{PMD-OF}$ and the maximum delay time $\Delta t_{MAX-COMP}$ the CM Algorithm can compensate. This predefined threshold $\Delta t_{THRESH}$ can then be expressed as $$\Delta t_{THRESH} = \sqrt{\Delta t_{MAX-COMP}^2 - \Delta t_{PMD-OF}^2}.$$

In order to have the predefined threshold $\Delta t_{THRESH}$ at hand for indicating to the control unit CU, shown in FIG. 1, which is the maximal allowable value for a time delay $\Delta t$ generated by the filter FIR1, alternative solutions are possible. According to a first alternative solution, the control unit CU is provided the predefined threshold $\Delta t_{THRESH}$ from an external source. According to a second alternative solution, the control unit is provided the mean time delay $\Delta t_{PMD-OF}$ and the maximum delay time $\Delta t_{MAX-COMP}$, and then itself determines the predefined threshold $\Delta t_{THRESH}$.

Instead of providing the mean time delay $\Delta t_{PMD-OF}$ to the control unit CU, the control unit CU may receives an indication of the overall time delay caused by the optical fibre OF as well as transmission components such as amplifiers and switches, and then the control unit CU uses this overall time delay as the mean time delay $\Delta t_{PMD-OF}$ for determining the predefined threshold $\Delta t_{THRESH}$.

Instead of providing the maximum delay time $\Delta t_{MAX-COMP}$ to the control unit CU, the control unit CU may receive an indication of the number M of filter coefficients as well as the sampling rate $f_{OSR}$, at which the optical signal osm'(t) is sampled, and then the control unit CU itself determines the maximum delay time $\Delta t_{MAX-COMP}$.

From the mean time delay $\Delta t_{PMD-OF}$ and the maximum delay time $\Delta t_{MAX-COMP}$, the control unit CU may determine the predefined threshold $\Delta t_{THRESH}$ as explained above.

As it has been mentioned previously above, the delay time $\Delta t$ is preferably varied at a frequency $f_{\Delta t}$ that is significantly smaller than the sampling rate $f_{SR}$ of the data signals x(k) and y(k), $$f_{\Delta t} \ll f_{SR}.$$

The advantage of this choice for the variation frequency $f_{\Delta t}$ is, that the optical reception unit ORU, shown in FIG. 2, will receive a number of values of the signals ux(l), uy(l) that are subject to a same delay time $\Delta t$ caused at the transmitting side. The CM Algorithm will be able to use this number of values of the signals ux(l), uy(l) for determining the filter coefficients of the filters F1, F2, F3, F4 without having to cope with a variation of the delay time $\Delta t$ for the duration of this number of values of the signals ux(l), uy(l). This will make it possible for the CM Algorithm to determine the filter coefficients of the filters F1, F2, F3, F4, such that they converge to optimized values during the duration of this number of values of the signals ux(l), uy(l).

Figure 3:
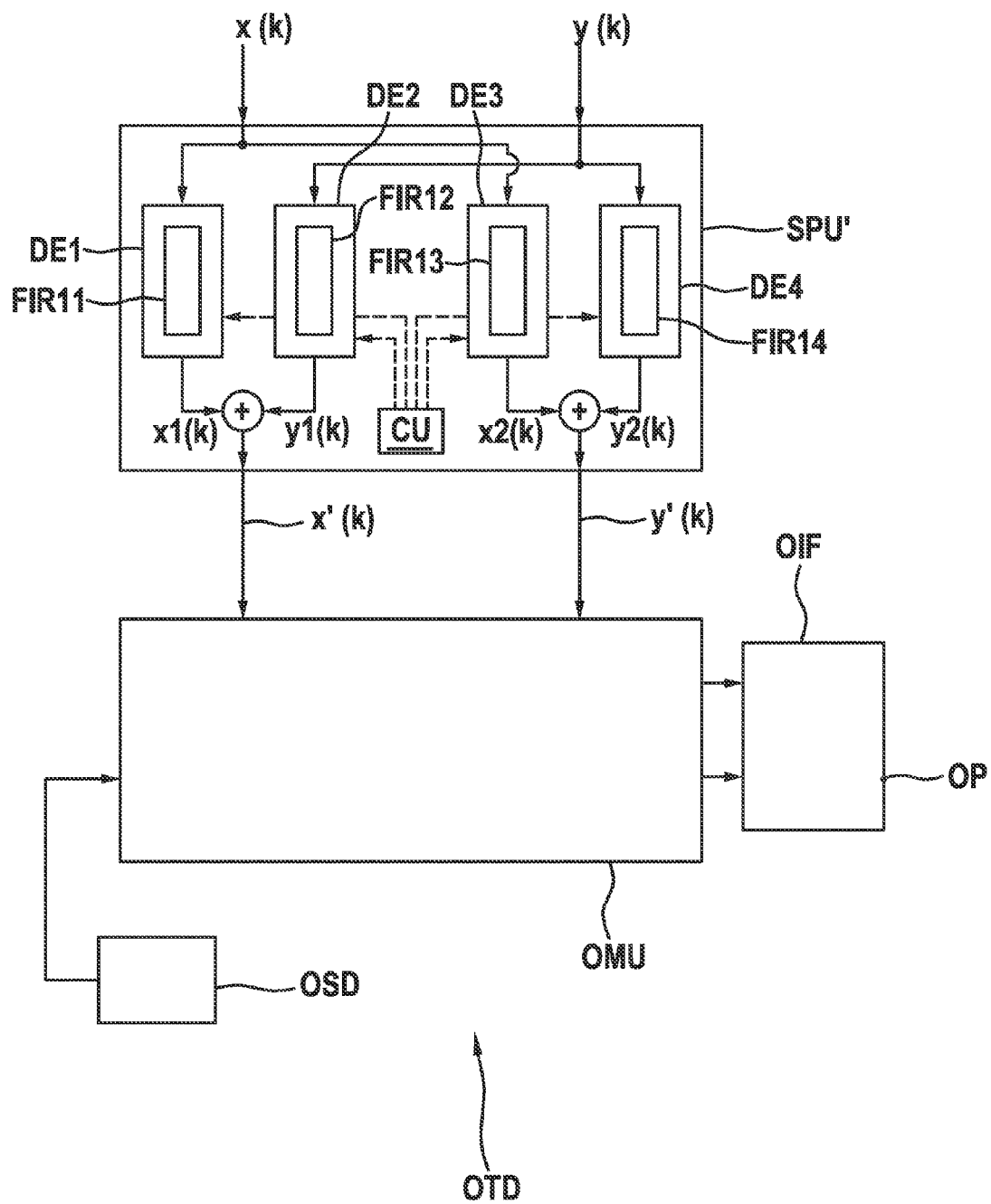
FIG. 3 shows a block diagram of the proposed optical transmission device according to a preferred embodiment.

FIG. 3 shows the optical transmission device OTD according to a preferred embodiment. The optical transmission device OTD contains the optical source device OSD, the optical modulation unit OMU and the optical interface OIF as previously described with regard to FIG. 1. Furthermore, the optical transmission device OTD contains an optical signal processing unit SPU'.

The optical signal processing unit SPU' receives the data signals x(k) and y(k). The optical signal processing unit SPU' contains at least two delay elements DE1 and DE3, for delaying the input data signals x(k) and y(k) to each other, by delaying the input data signal x(k). The optical signal processing unit SPU' may contain furthermore two further delay elements DE2 and DE4, for delaying the input data signals x(k) and y(k) to each other, by delaying the input data signal y(k).

The data signal x(k) is provided to the delay elements DE1 and DE3. The delay element DE1 provides an output data signal x1(k), and the delay element DE3 provides an output data signal x2(k).

The data signal y(k) is provided to the delay elements DE2 and DE4. The delay element DE2 provides an output data signal y1(k), and the delay element DE4 provides an output data signal y2(k). Preferably, the optical signal processing unit SPU' does not contain the delay elements DE2 and DE4, in which case the output data signals y1(k) and y2(k) are equal to the input data signal y(k).

The output data signal x'(k) is determined as the sum of the output data signals x1(k) and y1(k). The output data signal y'(k) is determined as the sum of the output data signals x2(k) and y2(k).

The control unit CU controls the delays caused by the delay elements DE1, DE2, DE3, DE4, such that the delays are varied over time as previously described with respect to the embodiment shown in FIG. 1. Preferably, the delay elements DE1, DE2, DE3, DE4 are provided in the form of respective finite impulse response filters FIR11, FIR12, FIR13, FIR14, wherein the filter coefficients h11(k), h12(k), h13(k), h14(k) of the finite impulse response filters FIR11, FIR12, FIR13, FIR14 are controlled by the control unit CU. The finite impulse response filters FIR11, FIR12, FIR13, FIR14 are of the length N.

The filter coefficients h11(k), h12(k), h13(k) and h14(k) of the filters FIR11, FIR12, FIR13 and FIR 14 preferably obey the conditions $$\sum_{k=0}^{N-1} |h_{11}(k)|^2 + \sum_{k=0}^{N-1} |h_{12}(k)|^2 = 1$$

and $$\sum_{k=0}^{N-1} |h_{13}(k)|^2 + \sum_{k=0}^{N-1} |h_{14}(k)|^2 = 1,$$

in order to distribute the energy of the input signals x(k) and y(k) onto the output signals x'(k) and y'(k), such that the energy of the signals x(k) and y(k) is preserved.

Furthermore, the filter coefficients h11(k), h12(k), h13(k) and h14(k) of the filters FIR11, FIR12, FIR13 and FIR 14 are preferably chosen, such that the optical signals resulting from the output signals x'(k) and y'(k) are orthogonal to each other.

The delays caused by the delay elements DE1, DE2, DE3, DE4 cause a delay between the input signals x(k) and y(k). The achievement of this, which is a change of the overall random character of the signal distortions during the optical transmission, has been described previously in detail with respect to the embodiment of FIG. 1 and in the introductory part of this application.

A further achievement is obtained, by summing the signals x1(k) and y1(k) to the signal x'(k), and by summing the signals x2(k) and y2(k) to the signal y'(k).

Thus, the input signal x(k) contributes to the output signal y'(k), and that the input signal y(k) contributes to the output signal x'(k).

The achievement is, that these contributions carried out in the domain of the data signals are equivalent to contributions of the optical signal osm1(t) to the optical signal osm2(t), shown in FIG. 1, in the optical signal domain, and vice versa. Since the filter coefficients of the filters FIR11, FIR12, FIR13, FIR14 obey the conditions described above, these contributions carried out in the domain of the data signals are equivalent to contributions of the optical signal osm1(t) and osm2(t) to each other in the optical signal domain, such that a rotation of polarization state of the combined optical signal osm(t), with its components, osm1(t) and osm2(t) is emulated. In other words, the superposition of the input signals x(k) and y(k) allows for an emulation of a rotation of the polarization state of the combined optical signal osm(t), with its components, osm1(t) and osm2(t) if the mentioned conditions for the filter coefficients are met.

By varying the filter coefficients of the filters FIR11, FIR12, FIR13, FIR14 in time, the control unit CU is also able to vary the emulation of the rotation of the polarization state of the combined optical signal osm(t) Thus, by varying the filter coefficients of the filters FIR11, FIR12, FIR13, FIR14 in time, not only a random character caused by a delay of the filters FIR11, FIR12, FIR13, FIR14 contributes to the overall random character of the transmission distortions, but also a further random character caused by the emulated rotation of the polarization state of the combined optical signal osm(t) contributes to the overall random character of the transmission distortions. Thus, the superposition of the input signals x(k) and y(k) for generation of the output signals x'(k) and y'(k) gives a further degree of freedom for changing the overall random character of the transmission distortions, which in turn helps to reduce the probability of bit error bursts during the transmission.

The emulated rotation of the polarization state of the combined optical signal osm(t) can be compensated for by the CM Algorithm, which is carried out at the optical reception unit ORU shown in FIG. 2.

A person of skill in the art would readily recognize that steps of various above-described methods can be performed by programmed computers or processors. The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS. 1, 2 and 3, including any functional blocks labeled as "processor", alternatively called "processing device", "processing unit" or "control unit", the functions may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "control unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that any block diagrams herein represent conceptual views of illustrative circuitry embodying the principles of the invention.

The invention claimed is:

1. Method of optical data transmission, comprising
receiving a first time-discrete data signal and a second time-discrete data signal at a same sampling rate,
generating a third time-discrete data signal and a fourth time-discrete data signal at said sampling rate, using said first data signal and said second data signal, wherein said first data signal and said second data signal are delayed to each other by a delay time that is varied over time at a variation frequency that is significantly smaller than said sampling rate using at least two delay elements,
modulating at least a phase of a first optical signal, said signal having a wavelength and a first polarization state, in dependence on said third data signal,
modulating at least a phase of a second optical signal, said signal having said wavelength and a second polarization state, in dependence on said fourth data signal,
transmitting the modulated first optical signal and the modulated second optical signal into an optical fibre, such that said first polarization state of said modulated first optical signal is orthogonal to said second polarization state of said second modulated optical signal,
wherein said first time-discrete data signal and said second time-discrete data signal contribute to said third time-discrete data signal,
and wherein said first time-discrete data signal and said second time-discrete data signal contribute to said fourth time-discrete data signal.

2. Method according to claim 1,
wherein said first data signal and said second data signal are delayed to each other, by filtering at least one of said first and said second data signals, using at least one finite-impulse response filter.

3. Method according to claim 2,
wherein the filter coefficients of said finite-impulse response filter are varied over time.

4. Method according to claim 3,
wherein at least one of said first data signal and said second data signal is filtered by said finite-impulse response filter (FIR1),
and wherein the filter coefficients of said finite-impulse response filter are chosen such, that the energy of the filtered signal is preserved.

5. Method according to claim 1,
wherein said delay time is kept below a predefined threshold.

6. Method according to claim 1, wherein said delay elements are finite-impulse response filters, and wherein the filter coefficients of said finite-impulse response filters are chosen, such that the energy of said first data signal and said second data signal is preserved.

7. Method according to claim 6,
wherein said filter coefficients of said finite-impulse response filters are chosen, such that the optical signals resulting from said third data signal and said fourth data signal are orthogonal to each other.

8. Optical transmission device, comprising a signal processing unit, adapted to
- receive a first time-discrete data signal and a second time-discrete data signal at a same sampling rate,
- generate a third time-discrete data signal and a fourth time-discrete data signal at said sampling rate, using said first data signal and said second data signal, such that said first data signal and said second data signal are delayed to each other by a delay time that is variable over time at a variation frequency that is significantly smaller than said sampling rate using at least two delay elements, and an optical modulation unit, adapted to
- modulate the phase of a first optical signal, said signal having a wavelength and a first polarization state, in dependence on said third data signal, and to
- modulate the phase of a second optical signal, said signal having said wavelength and a second polarization state, in dependence on said fourth data signal, and
- an optical interface, adapted to transmit the first and the second modulated optical signal into an optical fibre, such that said first polarization state of said first modulated optical signal is orthogonal to said first polarization state of said second modulated optical signal, wherein said first time-discrete data signal and said second time-discrete data signal contribute to said third time-discrete data signal, and wherein said first time-discrete data signal and said second time-discrete data signal contribute to said fourth time-discrete data signal.

9. Optical transmission device according to claim 8,
wherein said signal processing unit, is furthermore adapted to generate said third time-discrete data signal and said fourth time-discrete data signal, by superposing the delayed first and second data signals.

* * * * *